United States Patent
Byun

[11] Patent Number: 5,969,857
[45] Date of Patent: Oct. 19, 1999

[54] STAGE ASSEMBLY OF MICROSCOPE WHICH PREVENTS ITS PARTICLES OF WEAR FROM BEING DISPERSED

[75] Inventor: Chung-woo Byun, Kyungki-do, Rep. of Korea

[73] Assignee: Samsung Electronics Co., Ltd., Suwon, Rep. of Korea

[21] Appl. No.: 09/148,635

[22] Filed: Sep. 4, 1998

[30] Foreign Application Priority Data

Feb. 20, 1998 [KR] Rep. of Korea .......................... 98-5400

[51] Int. Cl.[6] .................................................. G02B 21/26
[52] U.S. Cl. ............................................ 359/393; 359/507
[58] Field of Search ..................... 359/393, 392, 359/391, 507

[56] References Cited

U.S. PATENT DOCUMENTS

| | | | |
|---|---|---|---|
| 4,827,725 | 5/1989 | Morse | 62/503 |
| 4,893,914 | 1/1990 | Hancock et al. | 359/393 |
| 5,466,979 | 11/1995 | Bryant et al. | 310/248 |
| 5,802,925 | 9/1998 | Kanao | 359/393 |

*Primary Examiner*—Jon Henry
*Attorney, Agent, or Firm*—Jones Volentine, LLP

[57] ABSTRACT

A microscope stage assembly prevents particles generated by the meshing of gears of the assembly from dispersing onto the hands of an operator. The assembly includes a stage, a drive system for the stage which is made up of X- and Y-axis drive pinions meshing with X- and Y-axis racks, respectively, and control knobs which are manipulated by an operator to rotate the drive pinions. In one embodiment, a particle collection tray is positioned between the gears and the control knobs to catch any particles falling from the gears before the particles reach the hands of the operator. In another embodiment, a vacuum system includes vacuum lines which open to the sides of the racks meshing with the drive pinions. Any particles produced by the meshing of the gears are removed from the area of the microscope via the vacuum lines. Thus, if the operator is taking part in a process that is sensitive to particle contamination, such as a semiconductor manufacturing process, the operator will not bring particles from the microscope with him when entering the clean room after having used the microscope to examine products being made in the clean room.

25 Claims, 8 Drawing Sheets

STAGE ASSEMBLY OF MICROSCOPE WHICH PREVENTS ITS PARTICLES OF WEAR FROM BEING DISPERSED

BACKGROUND OF THE INVENTION

1. Field of the Invention

The present invention relates to inspection equipment which is used in the process of manufacturing semiconductor devices. More particularly, the present invention relates to a stage assembly of a microscope used to examine wafers during the manufacture of a semiconductor device.

2. Description of the Related Art

The manufacturing yield of semiconductor devices can be reduced by process defects, material defects and various contaminants. Particles in the working environment are typical of such contaminants. In particular, particle defects are becoming a more serious problem as semiconductor devices become smaller in line with the demand for higher integration. Accordingly, the degree to which the cleanliness of the working environment is maintained must be improved. Therefore, processing equipment is continuously being redesigned to counter the problems of particle contamination of the working environment. However, such an effort has not yet been applied to secondary equipment which is used in connection with the manufacturing process but is operated away from the working environment. An example of such secondary equipment is the microscope. The introduction of particles into the working environment from such equipment is a problem which can be easily overlooked.

Figure 1:
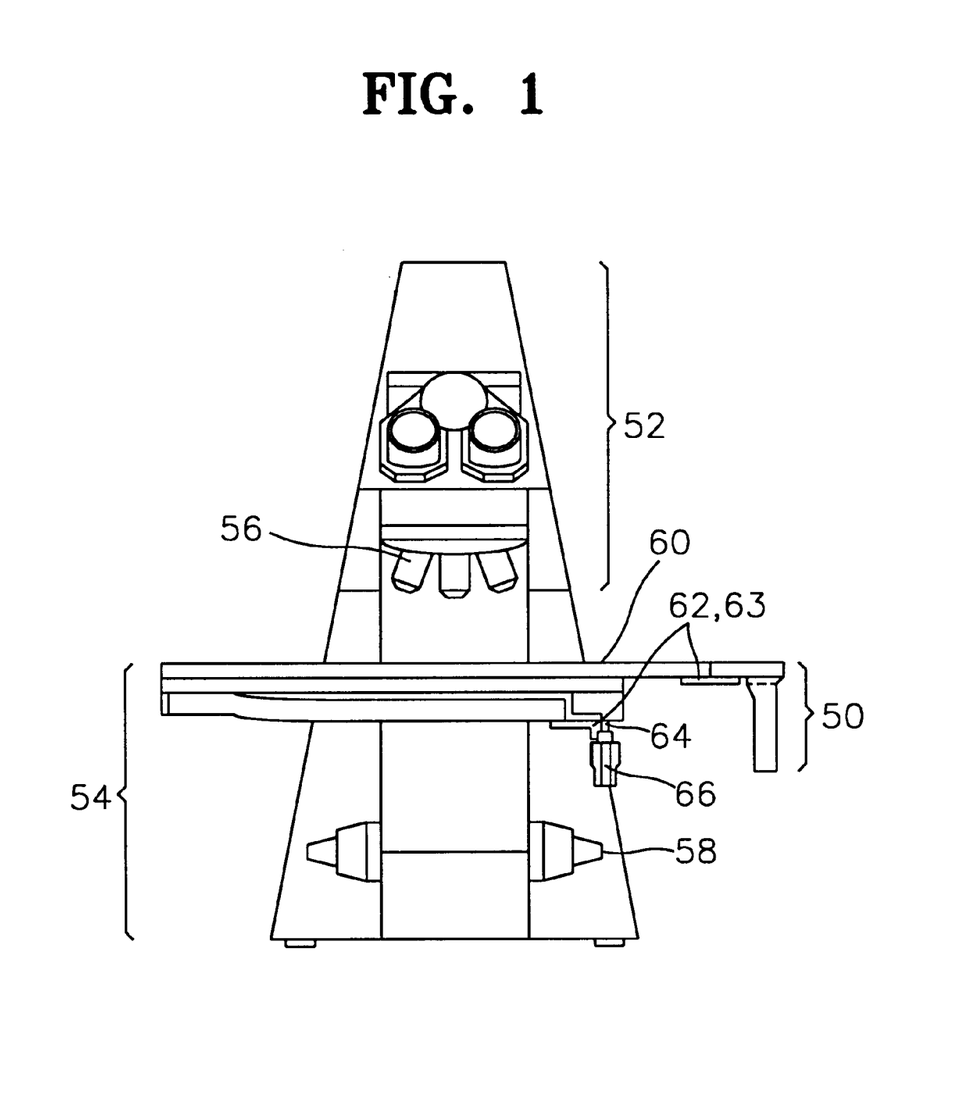
FIG. 1 is a front view of a conventional microscope.
Figure 2:
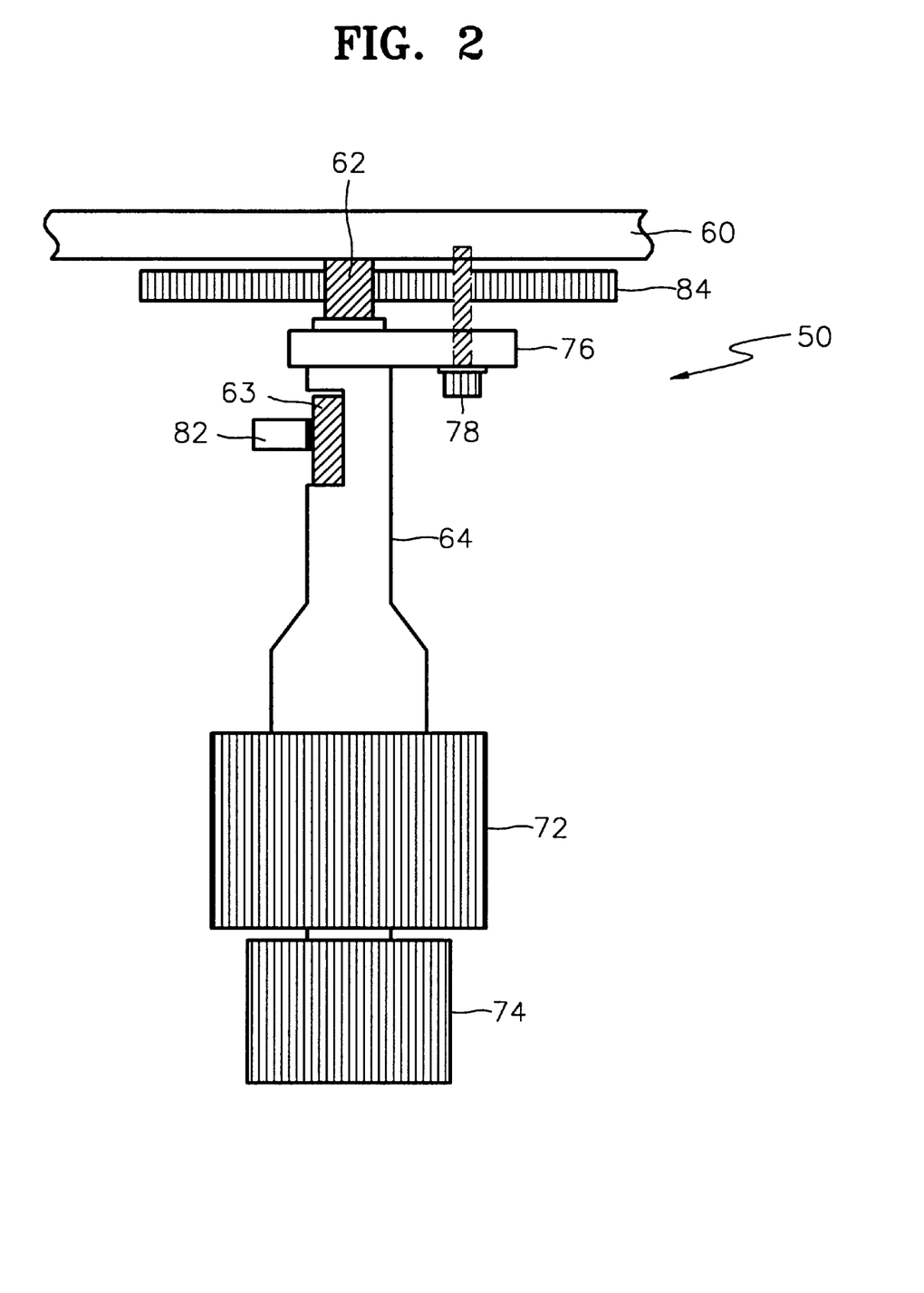
FIG. 2 is a side view of the stage assembly of the conventional microscope.

FIGS. 1 and 2 show a stage assembly of a conventional microscope. Referring to FIG. 1, the microscope generally comprises an upper end 52 including an objective lens(es) 56, and a lower end 54 including a stage assembly 50 and a focusing knob 58. In FIG. 1, reference numerals 62, 63 denote gears for moving the stage 60 of the stage assembly 50 along X and Y axes. The stage 60 supports an object to be examined, such as a wafer. Reference numeral 64 denotes a stage control column. Reference numeral 66 denotes a knob for controlling the movement of the stage 60 along the X and Y axes.

FIG. 2 is an enlarged side view of the stage assembly 50. The stage 60 is moved along the X and Y axes by an X-axis rack 84, a Y-axis rack 82, an X-axis drive pinion 62 and a Y-axis drive pinion 63 mounted on the stage control column 64. The control knob 66 includes a Y-axis control knob 72 and an X-axis control knob 74 mounted on the end of the stage control column 64. A separation plate 76 is interposed between the X-axis drive pinion 62 and the Y-axis drive pinion 63. A first fixing screw 78 in the separation plate 76 is connected to the stage 60. Therefore, the stage 60 can be moved along the X and Y axes in order to examine different parts of an object supported thereon. An operator wearing gloves moves the stage 60 along the X and Y axes by rotating the X- and Y-axis control knobs 74 and 72 provided on the end of the stage block control column 64.

However, the above-mentioned conventional technology has a problem in that particles such, as metal or TEFLON (a heat resistant, scratch resistant coating) fragments, come off the mating surfaces of the X- and Y-axis racks 62 and 63, and the X- and Y-axis drive pinions 84 and 82. The particles adhere to the hands of the worker, and thereby migrate into the working environment. TABLE 1 shows the results of measuring the metal fragments which had accumulated beneath the stage during a day.

TABLE 1

| | Particle Count | | | | | | | |
|---|---|---|---|---|---|---|---|---|
| size of particles (μm) | 0.07 | 0.10 | 0.15 | 0.20 | 0.30 | 0.50 | 0.70 | 1.00 |
| number of particles (N) | 32 | 32 | 29 | 25 | 20 | 10 | 7 | 6 |

It can be confirmed that particles in the quantities shown in the TABLE 1 cause various defects in the semiconductor devices, thus reducing the yield of the manufacturing process.

SUMMARY OF THE INVENTION

It is thus an object of the present invention to solve the above-described problem by providing a stage block assembly of a microscope which prevents the particles generated by the meshing of the gears thereof from dispersing onto the hands of the operator.

To achieve the above object, the present invention provides a microscope block assembly, comprising a microscope stage on which an object to be examined is to be supported, a rack disposed beneath the stage, a drive pinion which meshes with the rack for moving the stage in a predetermined linear direction when rotated, a stage control column on which the drive pinion is rotatably supported, a particle collection tray connected to the stage control column below the drive pinion for collecting particles which fall from the drive pinion, and a control knob provided at the end of the stage control column below the particle collection tray.

The particle collection tray preferably comprises a particle collection plate extending perpendicular to the stage control column, a particle containment wall extending upright along the periphery of the particle collection plate, and a tray fixing frame attached to the bottom of the particle collection plate. The particle collection plate and the particle containment wall are preferably formed of an anti-static acril. The fixing frame is preferably formed of metal or TEFLON.

The particle collection plate and the tray fixing frame each preferably have a hole through which the stage block control column passes. The particle collection plate and the tray fixing frame are also preferably each divided into two parts which can be easily attached to and detached from each other.

Also, the drive pinion is preferably supported at the end of the stage control column opposite that on which the control knob is provided. The drive pinion and the rack are preferably formed of a material selected from the group consisting of copper (Cu), stainless steel, and TEFLON (a heat resistant/scratch resistant coating).

In another embodiment which achieves the above object of the present invention, the microscope stage assembly comprises a vacuum system for removing the particles with suction. The system includes a vacuum line in open communication with a plurality of holes formed in the rack just below the area where the drive pinion meshes with the rack. Preferably, the holes are funnel-shaped.

The vacuum line is connected to exterior vacuum tubing so that particles drawn into the vacuum line through the funnel-shaped holes can be led by the vacuum tubing away from the microscope.

BRIEF DESCRIPTION OF THE DRAWINGS

The above and other objects, features and advantages of the present invention will become more apparent by referring to the following detailed description of preferred embodiments thereof made with reference to the attached drawings in which.

DETAILED DESCRIPTION OF THE PREFERRED EMBODIMENTS

Preferred embodiments of the present invention will now be described in detail with reference to the attached drawings.

FIGS. 3 through 7 show a first embodiment of a stage assembly of a microscope according to the present invention.

Figure 3:
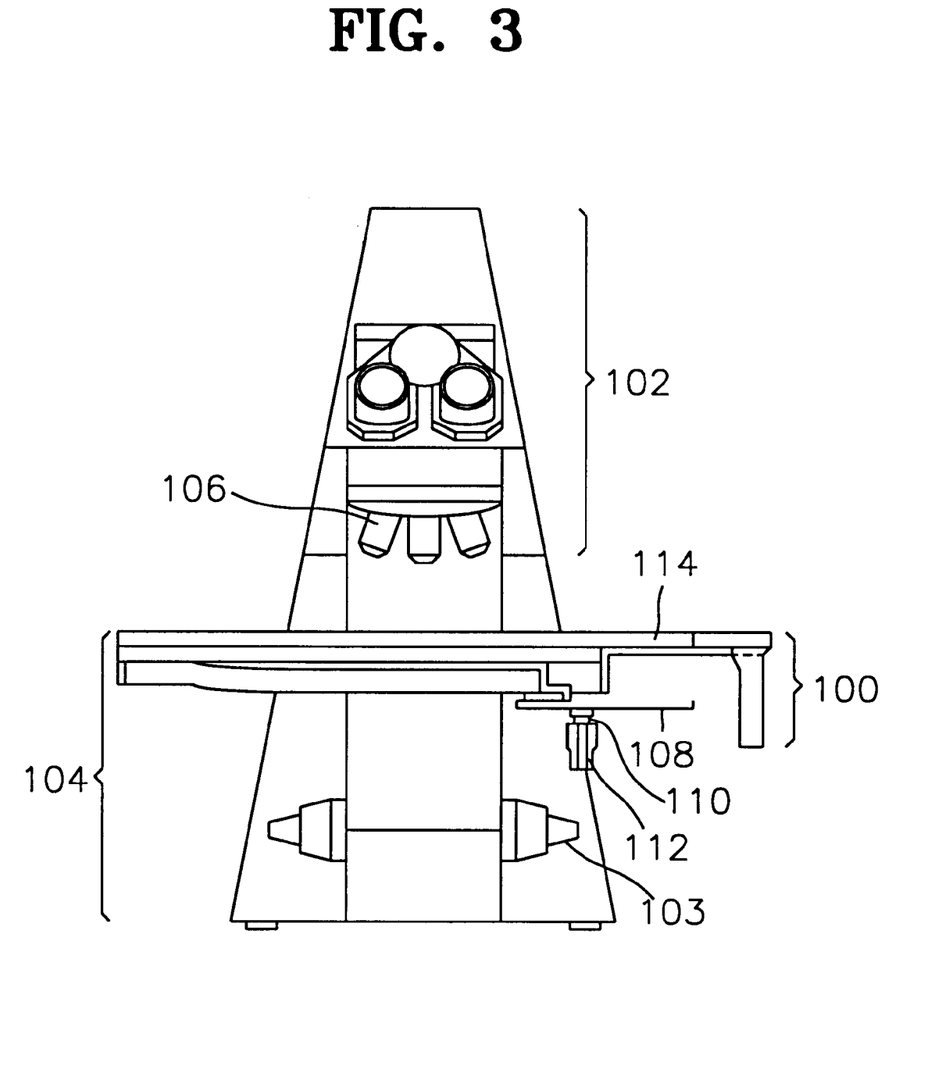
FIG. 3 is a front view of a microscope having a first embodiment of a stage assembly according to the present invention.

Referring first to FIG. 3, the microscope comprises an upper end 102 including an objective lens(es) 106, and a lower end 104 including a stage assembly 100 and focusing knob 103. The object to be examined, such as a wafer, is mounted on a stage 114 of the stage assembly 100. The position of the stage 114 relative to the objective lens 106 is controlled by an X-Y axis control knob 112 disposed on the end of a stage control column 110 connected to the stage 114.

Figure 4:
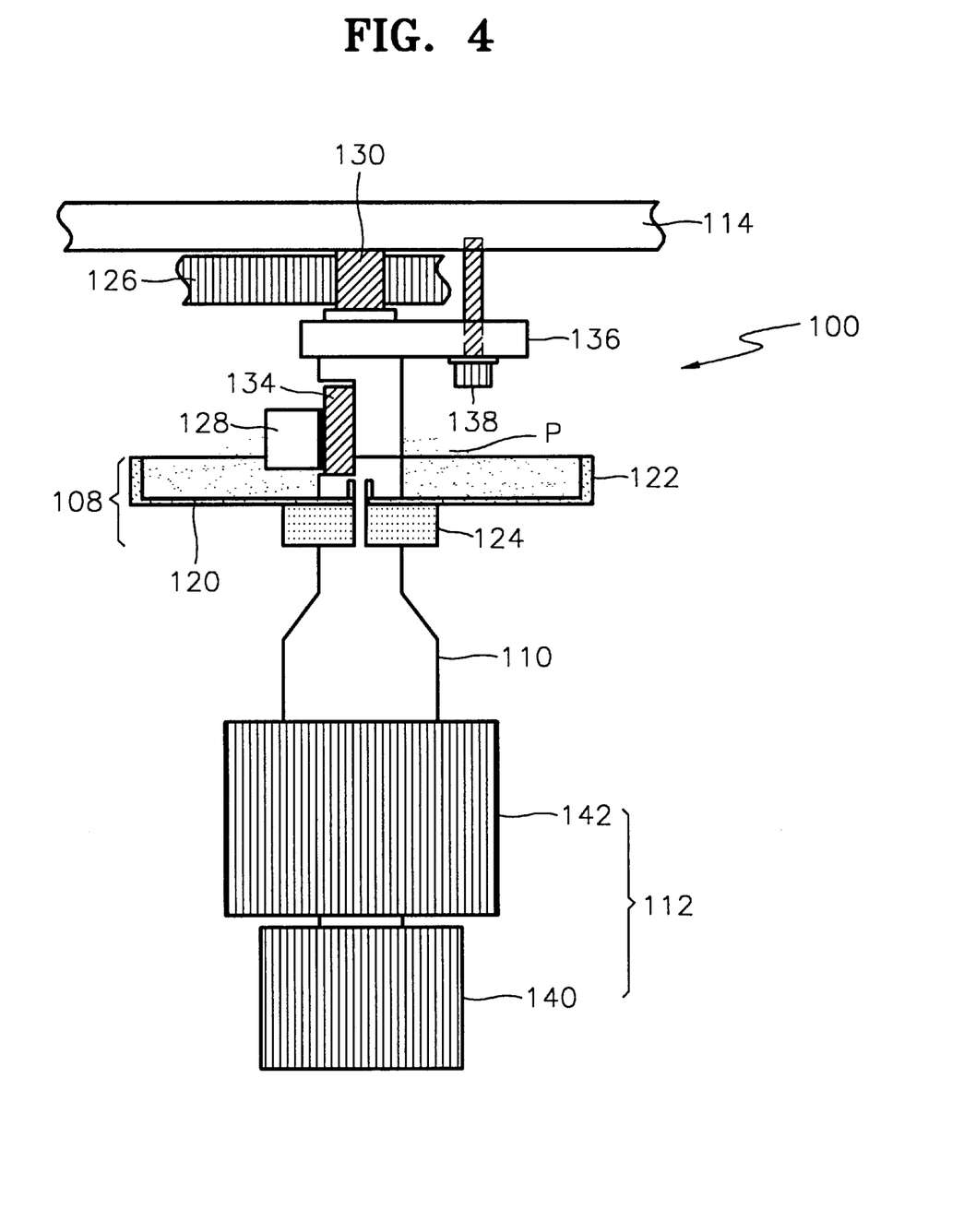
FIG. 4 is a side view of the first embodiment of a stage assembly according to the present invention.

Next, referring to FIG. 4, the stage 114 is connected to X- and Y-axis racks 126 and 128. A Y-axis drive pinion 134 engaged with the Y-axis rack 128, for moving the stage 114 along the Y axis, is disposed on the stage control column 110 below the X-axis rack 126. An X-axis drive pinion 130, supported on an end of the stage block column 110, is engaged with the X-axis rack for moving the stage 114 along the X-axis. The X-axis and Y-axis drive pinions 130 and 134 and the X-axis and Y-axis racks 126 and 128 are formed of a material selected from the group consisting of copper (Cu), stainless steel, and TEFLON.

A separation plate 136 is connected to the stage 114 by a first fixing screw 138 located between the X-axis drive pinion 130 and the Y-axis drive pinion 134. Therefore, when a worker turns the X-axis control knob 140 and the Y-axis control knob 142 on the lower end of the stage control column 110, the stage 114 is moved along the X and Y axes. Particles (P) from the mating surfaces of the X-axis rack 126 and the X-axis drive pinion 130 and of the Y-axis rack 128 and the Y-axis drive pinion 134, are caught by a particle collection tray 108 and do not fall onto the hands of the worker which are operating the control knob(s). Thus the particles (P) do not contaminate the wafer or migrate into the working environment. Reference numerals 120,122, and 124 respectively designate a particle collection plate, a particle containment wall, and a tray fixing frame of the particle collection tray 108.

The particle collection plate 120 is formed of an antistatic acril. The particle containment wall 122 is formed of the same material as the particle collection plate 120 and extends vertically from the periphery of the particle collection plate 120. The tray fixing frame 124 is formed of metal or TEFLON and is attached to the lower portion of the particle collection plate 120.

Figure 5:
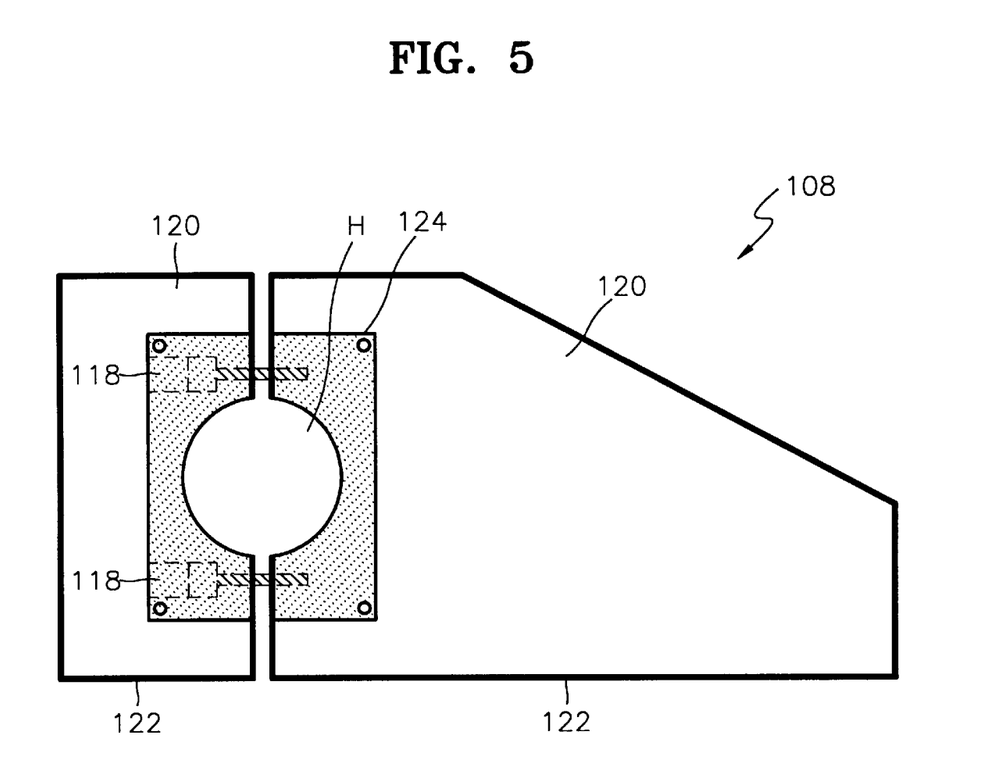
FIG. 5 is a plan view of a particle collection tray of the first embodiment of a stage assembly according to the present invention.

As best shown in FIG. 5, the particle collection plate 120 and the tray fixing frame 124 are divided into two parts that are easily attachable to and detachable from one another. Accordingly, the particles (P) which collect on the particle collection plate 120 can be periodically emptied. The two halves of the particle collection plate 120 and tray fixing frame 124 are connected to each other by at least one fixing screw 118 provided at the lower portion of the tray fixing frame 124. The stage control column 110 of FIG. 4 fits into a hole (H) defined in the center of the particle collection tray 108.

Figure 6:
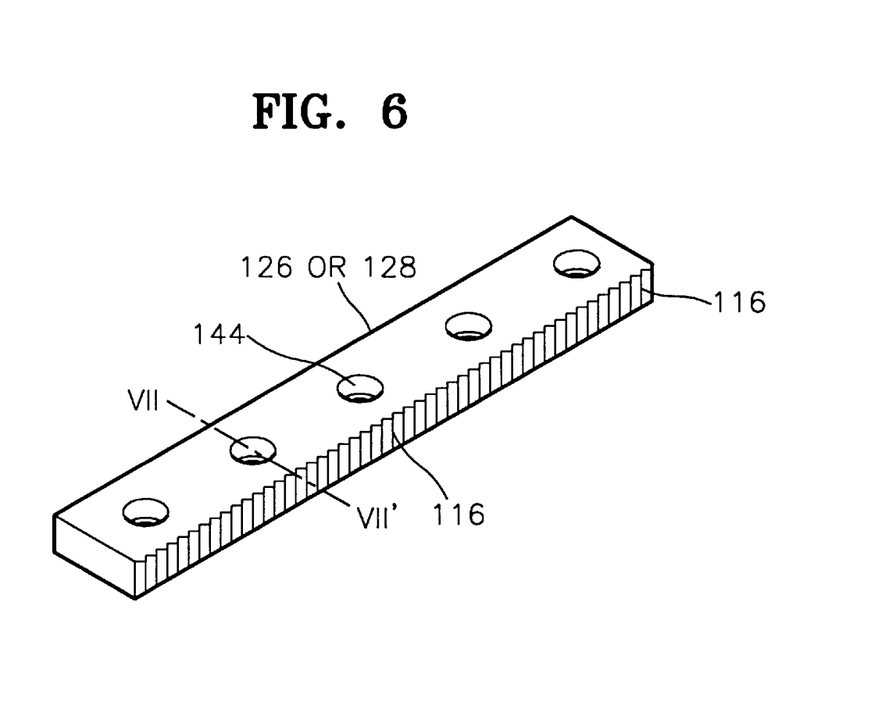
FIG. 6 is a perspective view of a rack of the first embodiment of a stage assembly according to the present invention.
Figure 7:
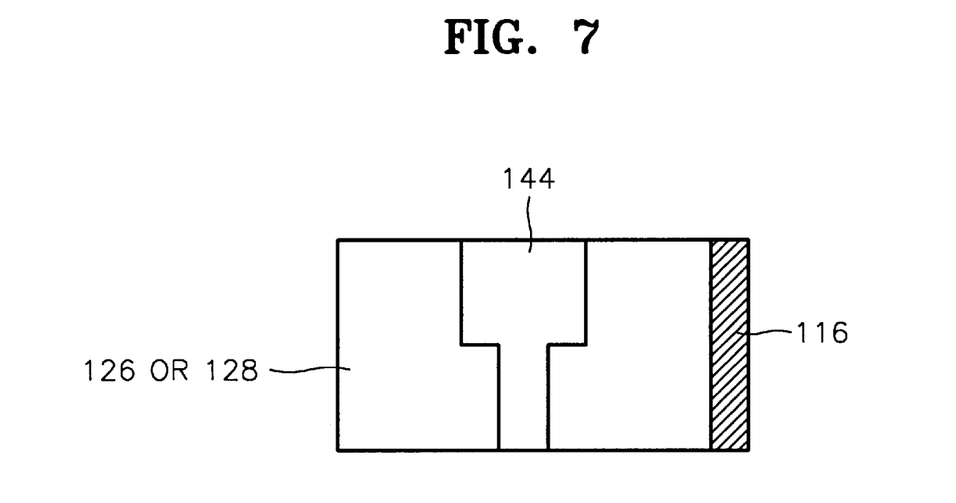
FIG. 7 is a cross-sectional view of the rack taken along line VII—VII' of FIG. 6.

Referring now to FIGS. 6 and 7, the X- and Y-axis racks 126 and 128 are fixed in place in the assembly by screws which pass through screw holes 144. Gear teeth 116 formed along one side of the rack (126 or 128) mesh with the drive pinion (130 or 134 in FIG. 4) associated therewith.

Second Embodiment

In the second embodiment of the present invention, the particles which come off the X- and Y-axis racks and the X- and Y-axis drive pinions are suctioned into holes connected to a vacuum line instead of being collected in a particle collection tray. The other elements of the second embodiment are similar to those of the first embodiment and thus, will not be described in detail.

Figure 8:
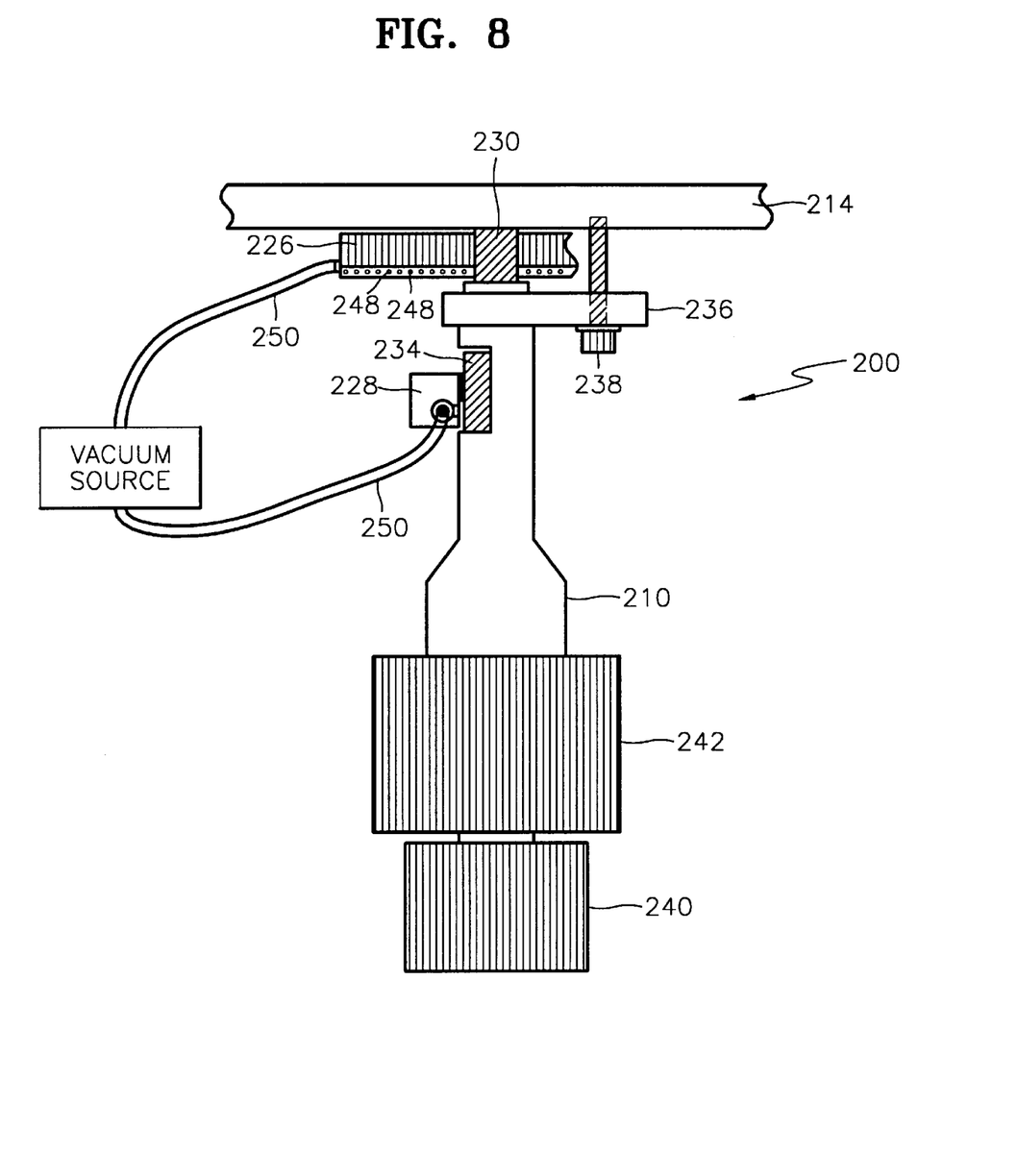
FIG. 8 is a side view of a second embodiment of a stage assembly according to the present invention.

Referring now to FIG. 8, the gear teeth 226, 228 of each X- and Y-axis rack 226, 228 do not extend along the entire side of the rack. Rather, the gear teeth terminate above an area reserved for a vacuum line into which particles, generated from the mating surfaces of the X- and Y-axis drive pinions 230 and 234 and X- and Y-axis racks 226 and 228, are suctioned. The particles shed from the mating surfaces of the X- and Y-axis drive pinions 230 and 234 and the X- and Y-axis racks 226 and 228 enter the vacuum line through holes 248. The vacuum line is in turn connected to an exterior vacuum tube 250 connected to a vacuum source such as a vacuum pump. The particles are led away from the microscope itself by the tubing 250.

Figure 9:
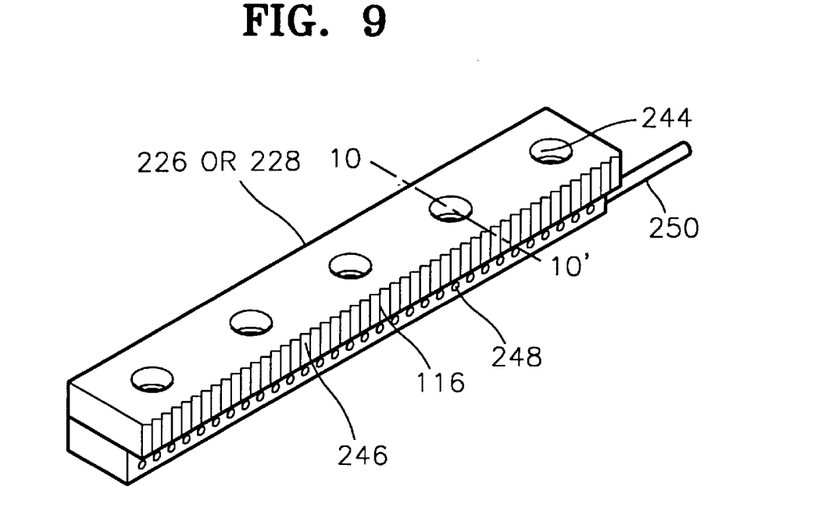
FIG. 9 is a perspective view of a rack of the second embodiment of a stage assembly according to the present invention.
Figure 10:
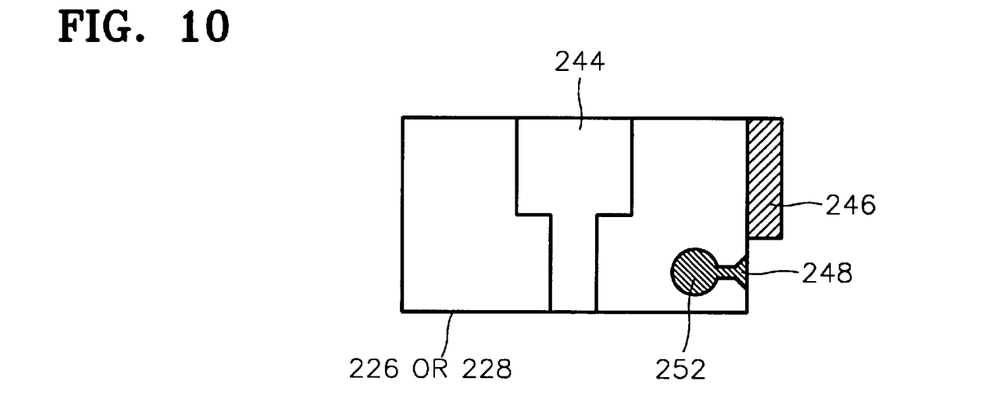
FIG. 10 is a sectional view of the rack of the second embodiment taken along line 10—10' of FIG. 9.
Figure 11:
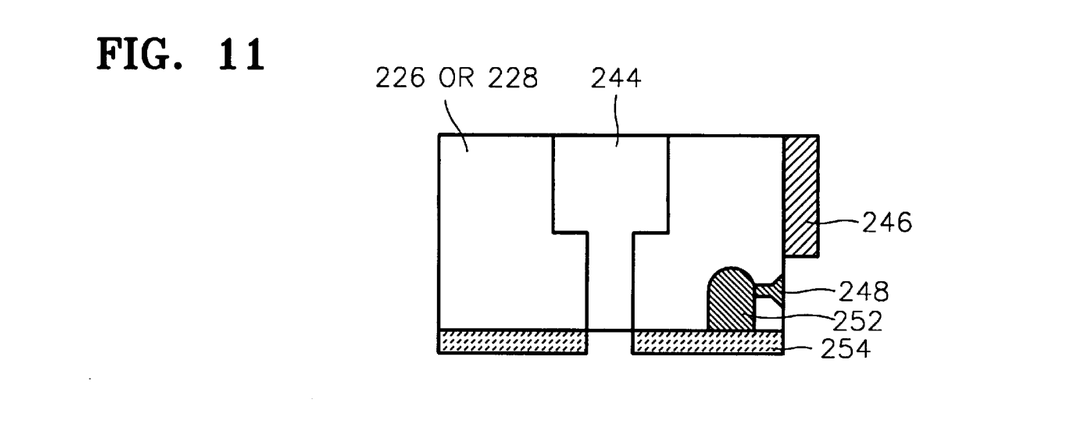
FIG. 11 is a similar cross-sectional view but of another form of the rack.

As best shown in FIGS. 9–11, the X- and Y-axis racks 226 and 228 are mounted in the stage assembly by screws which pass through screw holes 244 extending vertically through the X- and Y-axis racks 226 and 228. The vacuum line 252 is formed within the X- and Y-axis racks 226 and 228 adjacent the side thereof at which the gear teeth 246 are provided. The vacuum line 252 is open to one end of the rack, whereby the vacuum line 252 can be connected to the exterior vacuum tube 250. The holes 248, on the other hand, are open to the side of the rack where the gear teeth 246 are provided at locations just below the gear teeth 246. The holes 248 are in open communication with the vacuum line 252 so that particles, generated when the gear teeth 246 mesh with the X- and Y-axis drive pinions 230 and 234, are suctioned through the holes 248 by the vacuum produced in the vacuum line 252.

Referring specifically to FIG. 10, the vacuum line 252 can take the form of a horizontal bore extending through the lower portion of the X- or Y-axis rack 226 or 228. The holes 248 can be funnel-shaped in order to enhance their ability to draw the particles therethrough.

FIG. 11 shows another form of the vacuum line 252. Here, the vacuum line 252 is formed by milling a groove in the lower surface of the X or Y axis rack 226 or 228, and covering the groove with a plate 254 attached to the body of the rack.

The following TABLE 2 shows the numbers of particles found in the lower portion of the microscope during one day, after the particle collection tray had been installed in the microscope.

TABLE 2

| | Particle Count | | | | | | | |
|---|---|---|---|---|---|---|---|---|
| size of particles ($\mu$m) | 0.07 | 0.10 | 0.15 | 0.20 | 0.30 | 0.50 | 0.70 | 1.00 |
| number of particles (N) | 0 | 0 | 0 | 0 | 0 | 0 | 0 | 0 |

The number of particles generated differs slightly according to the speed at which the stage block assembly moves. However, when the particle collection tray or the vacuum system according to the present invention is installed in the microscope, it is possible to prevent the particles from migrating into the process environment on the hands of the worker or the wafer carrier. Again, this is of concern when the microscope is being used to examine products made by a sensitive process in which the number of particles affects the yield, such as a semiconductor manufacturing process.

The present invention is not limited to the embodiments described above. Rather, many variations and modifications will become readily apparent to those skilled in the art. For example, the particle collection tray is shown as being polygonal in the preferred embodiment. However, it could also be circular. The vacuum line in the X- and Y-axis racks is shown as having a circular cross section, but it could instead have a quadrilateral cross section or a cross section of another shape. Therefore, all such variations and modifications are seen to be within the true spirit and scope of the present invention as defined by the appended claims

What is claimed is:

1. A microscope stage assembly, comprising:
   a microscope stage on which an object to be examined is to be supported;
   an X-axis rack and a Y-axis rack disposed beneath said stage and extending in X- and Y-axis directions perpendicular to one another, respectively;
   an X-axis drive pinion which meshes with said X-axis rack, the X-axis drive pinion and the X-axis rack being connected to said stage so as to move the stage in said direction of the X-axis;
   a Y-axis drive pinion which meshes with said Y-axis rack, the Y-axis drive pinion and the Y-axis rack being connected to said stage so as to move the stage in said direction of the Y axis;
   a stage control column extending vertically beneath said stage and supporting said X-axis and Y-axis drive pinions;
   X-axis and Y-axis control knobs disposed at an end of said stage control column, said X-axis and Y-axis control knobs being connected to said X-axis and Y-axis drive pinions, respectively; and
   a particle collection tray connected to said stage control column and positioned between the control knobs and the drive pinions for collecting particles which fall from the X-axis and Y-axis drive pinions before the particles reach the control knobs.

2. The stage block assembly of claim 1, wherein said X-axis drive pinion is disposed below said stage and above said Y-axis drive pinion.

3. The stage block assembly of claim 1, wherein said X-axis drive pinion is supported at an end of said stage control column opposite that at which said X-axis and Y-axis control knobs are disposed.

4. The stage block assembly of claim 1, and further comprising a separation plate mounted to said stage control column and interposed between said X-axis drive pinion and said Y-axis drive pinion, and a fixing screw fixing said separation plate to said stage.

5. The stage block assembly of claim 1, wherein said X-axis and Y-axis drive pinions and said X-axis and Y-axis racks are formed of a material selected from the group consisting of copper (Cu), stainless steel, and a heat resistant/scratch resistant coating.

6. The stage block assembly of claim 1, wherein said particle collection tray comprises a particle collection plate extending in a plane perpendicular to the stage control column, a particle containment wall extending vertically along the periphery of said particle collection plate, and a tray fixing frame attached to the lower portion of the particle collection plate and connected to said stage control column.

7. The stage block assembly of claim 6, wherein said particle collection plate and said particle containment wall are formed of an antistatic acril.

8. The stage block assembly of claim 6, wherein said tray fixing frame is formed of a material selected from a group consisting of metal and a heat resistant/scratch resistant coating.

9. The stage block assembly of claim 6, wherein said particle collection plate and said tray fixing frame each define a hole through which said stage control column passes.

10. The stage assembly of claim 6, wherein said particle collection tray comprises two halves which are attachable to and are detachable from each other, the halves of said particle collection tray sandwiching said stage control column therebetween.

11. The stage block assembly of claim 10, wherein each of said particle collection plate and said tray fixing frame of the particle collection tray is divided in half, and said particle collection tray also includes screws fixing the halves of said tray fixing frame together about said stage control column.

12. A microscope stage assembly, comprising:
   a microscope stage on which an object to be examined is to be supported;
   an X-axis rack and a Y-axis rack disposed beneath said stage and extending in X- and Y-axis directions perpendicular to one another, respectively;
   an X-axis drive pinion which meshes with said X-axis rack, the X-axis drive pinion and the X-axis rack being connected to said stage so as to move the stage in said direction of the X-axis;

a Y-axis drive pinion which meshes with said Y-axis rack, the Y-axis drive pinion and the Y-axis rack being connected to said stage so as to move the stage in said direction of the Y axis;

a stage control column extending vertically beneath said stage and supporting said X-axis and Y-axis drive pinions;

X-axis and Y-axis control knobs disposed at an end of said stage control column, said X-axis and Y-axis control knobs being connected to said X-axis and Y-axis drive pinions, respectively; and a vacuum system comprising an X-axis vacuum line open at a location between that at which said X-axis drive pinion meshes with said X-axis rack and said X-axis and Y-axis control knobs, and a Y axis vacuum line open at a location between that at which said Y-axis drive pinion meshes with said Y-axis rack and said X-axis and Y-axis control knobs, whereby particles falling from said rack and pinions are removed through said vacuum lines before reaching the control knobs.

13. The stage assembly of claim 12, wherein said X-axis drive pinion is supported at an end of said stage control column opposite that at which said X-axis and Y-axis control knobs are disposed.

14. The stage assembly of claim 12, and further comprising a separation plate mounted to said stage control column and interposed between said X-axis drive pinion and said Y-axis drive pinion, and a fixing screw fixing said separation plate to said stage.

15. The stage assembly of claim 12, wherein said X-axis and Y-axis drive pinions and said X-axis and Y-axis racks are formed of a material selected from the group consisting of copper (Cu), stainless steel, and a heat resistant/scratch resistant coating.

16. The stage assembly of claim 12, wherein said X-axis and Y-axis vacuum lines extend through said X- and Y-axis racks, respectively.

17. The stage block assembly of claim 16, wherein said vacuum system also comprises vacuum tubes extending outside of said racks and to which said X-axis and Y-axis vacuum lines are connected.

18. The stage block assembly of claim 16, wherein said vacuum system also comprises holes extending in said racks, each of said holes extending between a respective side of the rack and the vacuum line in the rack and having the shape of a funnel.

19. A microscope stage assembly, comprising:

a microscope stage on which an object to be examined is to be supported;

a rack and pinion gear system disposed beneath and connected to said stage so as to move said stage in a predetermined direction when a pinion of said gear system is rotated;

a stage control column on which said pinion is rotatably supported;

a control knob disposed on said column and connected to said pinion such that rotating said control knob causes said pinion to rotate and move said stage; and particle trapping means, located between said pinion and said control knob, for preventing particles, generated by the meshing of said pinion with a rack of said rack and pinion gear system, from falling onto the hand of an operator while the operator is manipulating the control knob.

20. The microscope stage assembly of claim 19, wherein said particle trapping means comprises a particle collection tray connected to said stage control column and positioned between said control knob and said pinion.

21. The microscope stage assembly of claim 20, wherein said particle collection tray comprises two halves which are attachable to and are detachable from each other, the halves of said particle collection tray sandwiching said stage control column therebetween.

22. The microscope stage assembly of claim 19, wherein said particle trapping means comprises a vacuum system including a vacuum line open at a location between that at which said pinion meshes with the rack and said control knob.

23. The microscope stage assembly of claim 22, wherein said vacuum line extends through the rack.

24. The microscope stage assembly of claim 23, wherein said vacuum system also includes a vacuum tube extending outside of the rack and to which said vacuum line is connected.

25. The microscope stage assembly of claim 24, wherein said vacuum system also comprises holes extending in the rack, each of said holes extending between a respective side of the rack and the vacuum line and having the shape of a funnel.

* * * * *